United States Patent
Momiyama et al.

(10) Patent No.: US 7,762,894 B2
(45) Date of Patent: Jul. 27, 2010

(54) CONSTANT VELOCITY JOINT

(75) Inventors: Kazuo Momiyama, Tokyo (JP); Takashi Okaniwa, Fujisawa (JP)

(73) Assignees: Honda Motor Co., Ltd., Tokyo (JP); Kyodo Yushi Co., Ltd., Kanagawa (JP)

( * ) Notice: Subject to any disclaimer, the term of this patent is extended or adjusted under 35 U.S.C. 154(b) by 382 days.

(21) Appl. No.: 11/667,554

(22) PCT Filed: Nov. 25, 2005

(86) PCT No.: PCT/JP2005/021736

§ 371 (c)(1),
(2), (4) Date: May 11, 2007

(87) PCT Pub. No.: WO2006/057367

PCT Pub. Date: Jun. 1, 2006

(65) Prior Publication Data

US 2007/0298890 A1 Dec. 27, 2007

(30) Foreign Application Priority Data

Nov. 25, 2004 (JP) ............................. 2004-341164

(51) Int. Cl.
*F16D 3/205* (2006.01)
(52) U.S. Cl. ........................ 464/11; 464/905; 508/156
(58) Field of Classification Search ............. 464/7, 464/11, 15, 111, 905; 508/363–365, 371, 508/433, 552, 156

See application file for complete search history.

(56) References Cited

U.S. PATENT DOCUMENTS

| 5,295,914 | A | * | 3/1994 | Milavec ..................... 464/905 |
| 5,449,471 | A | * | 9/1995 | Ozaki et al. |
| 6,333,297 | B2 | | 12/2001 | Takabe |
| 6,355,602 | B1 | | 3/2002 | Okaniwa et al. |
| 6,376,432 | B1 | * | 4/2002 | Leslie et al. ............ 508/156 X |
| 2001/0007832 | A1 | | 7/2001 | Takabe |
| 2005/0020456 | A1 | * | 1/2005 | Kawamura et al. ........... 508/364 |

FOREIGN PATENT DOCUMENTS

| CA | 1332936 C | 11/1994 |
| EP | 0661378-A1 A1 | 7/1995 |
| JP | 2-20597 A | 1/1990 |
| JP | 07-236188 | 9/1995 |
| JP | 7-286188 A | 10/1995 |

(Continued)

OTHER PUBLICATIONS

"MOLYVAN A Friction Reducer/Antiwear Compound" Specification, R.T. Vanderbilt Company, Inc., Sep. 8, 2008.

(Continued)

*Primary Examiner*—Greg Binda
(74) *Attorney, Agent, or Firm*—Birch, Stewart, Kolasch & Birch, LLP

(57) ABSTRACT

Each boot of a tripot type constant velocity joint comprises a polyester-based thermoplastic elastomer (TPC). A grease encapsulated in the boot comprises a base oil, a thickening agent comprising a diurea-based compound, molybdenum dialkyldithiocarbamate sulfide, a sulfur-phorsphorous based extreme-pressure agent being a sulfur-phosphorus based compound containing sulfur and phosphorous as constituting elements, and potassium borate hydrate.

10 Claims, 6 Drawing Sheets

| | FOREIGN PATENT DOCUMENTS | |
|---|---|---|
| JP | 8-23034 B2 | 3/1996 |
| JP | 10-273692 | 10/1998 |
| JP | 2001-11482 A | 1/2001 |
| JP | 2001-159428 A | 6/2001 |
| JP | 2001-193751 | 7/2001 |
| JP | 2001-329288 | 11/2001 |
| WO | WO 98/17748 A1 | 4/1998 |

OTHER PUBLICATIONS

Japanese Office Action issued in Japanese patent application No. 2004-341164 on Jan. 26, 2010.

Supplementary European Search Report dated Mar. 19, 2010 for corresponding European Application No. 05809719.7.

* cited by examiner

FIG. 6

| | EMBODIMENT | | | COMPARATIVE EXAMPLE | | | |
|---|---|---|---|---|---|---|---|
| | 1 | 2 | 3 | 1 | 2 | 3 | 4 |
| THICKENING AGENT (Diurea Compound) [mass %] | 5 | 5 | 5 | 5 | 5 | 5 | 5 |
| BASE OIL (Mineral Oil) [mass %] | 91.5 | 98.9 | 87 | 93.5 | 92.5 | 92 | 90.5 |
| ADDITIVES Molybdenum Dialkyldithiocarbamate Sulfide [mass %] | 2 | 0.5 | 5 | – | 2 | 2 | 2 |
| Sulfur-Phosphorus Based Extreme Pressure Agent [mass %] | 1 | 0.5 | 2 | 1 | – | 1 | 1 |
| Potassium Borate Hydrate [mass %] | 0.5 | 0.1 | 1 | 0.5 | 0.5 | – | 0.5 |
| Sulfur Based Extreme Pressure Agent [mass %] | – | – | – | – | – | – | 1 |
| BOOT DURABILITY | ○ | ○ | ○ | ○ | ○ | ○ | × |
| COEFFICIENT OF FRICTION | ○ | ○ | ○ | × | × | △ | △ |

CONSTANT VELOCITY JOINT

TECHNICAL FIELD

The present invention relates to a constant velocity (universal) joint in which grease, formed by adding predetermined components to a base oil, is enclosed inside a boot.

BACKGROUND ART

In automotive vehicles, the rotational power (motive force) generated by various types of engines such as internal combustion engines, motors and the like is transmitted to a hub from a differential gear via plural transmission shafts of a half shaft, a spline shaft, etc, thereby tires thereof rotate.

The differential gear and the spline shaft are connected to each other through a so-called inboard side constant velocity joint, whereas the spline shaft and hub are connected to each other through a so-called outboard side constant velocity universal joint. Generally, the inboard side constant velocity universal joint performs a function to ease both an angular displacement and an axially directed displacement of the spline shaft, and the outboard side constant velocity universal joint carries out a role of easing the angular displacement of the spline shaft. As a result thereof, transmission of drive forces that accompany changes in an advancing direction, and more specifically changes in angle, are carried out rapidly, while upward and downward movements of the suspension are absorbed. As the inboard side constant velocity universal joint, a sliding type of constant velocity universal joint is employed, which is capable of making displacements in an axial direction of the spline shaft.

Recently, various ongoing research and development has been conducted with respect to inboard side constant velocity universal joints, which even more rapidly respond to axially directed displacements of the spline shaft. When this type of inboard side constant velocity universal joint is used, because the inboard side constant velocity universal joint is separated relatively from the engine, it becomes difficult to receive radiated heat from the engine. Due to this fact, it has been attempted to cover the connecting portion between the inboard side constant velocity universal joint and the spline shaft using a resin-made boot, which conventionally cannot be used out of fears concerning heat resistance.

Formerly, as materials used for these types of boots, chloroprene rubber (CR) and chlorinated polyethylene rubber (CM) compositions have been used, wherein in addition, grease is enclosed inside of the boots. As for the greases used, greases such as those disclosed in Patent Document 1 and Patent Document 2 may be cited.

Patent Document 1: Japanese Patent Publication No. 8-23034

Patent Document 2: Japanese Laid-Open Patent Publication No. 2001-11482

DISCLOSURE OF THE INVENTION

Incidentally, boots for inboard side constant velocity universal joints made from CR or CM deteriorate earlier in comparison with boots made similarly from CR or CM but used for outboard side constant velocity universal joints. Specifically, the tensile strength and tensile elongation thereof tend to become small within a comparatively short period of time. The reason is that, as discussed above, the inboard side constant velocity universal joint is arranged at a position more closely to the engine as compared to the outboard side constant velocity universal joint, and accordingly, it is conjectured that radiant heat from the engine is received more easily by the inboard side constant velocity universal joint than the outboard side constant velocity universal joint.

Further, recently, out of considerations directed toward environmental protection, there has been a desire to recycle and reuse various structural elements of automobiles. However, CR and CM both have the disadvantage that reuse of such materials is difficult.

To eliminate the aforementioned disadvantages, it has been proposed to construct an inboard side constant velocity universal joint boot using polyester-based thermoplastic elastomer (TPC) materials. However, when such a resin-made boot is installed onto an automobile and a heat resistance test is conducted, the heat resistance thereof has not been able to fulfill the capabilities that are estimated to be possible based on the physical properties of TPC.

When such resin-made boots deteriorate, cracks are generated in the resin-made boots, and leakage of grease from the cracks occurs. When this condition occurs, for example, the lubricating ability during sliding movement of the inner member of the inboard side constant velocity universal joint cannot be ensured, and as a result, there is a fear that seizure of the sliding members could occur.

Upon conducting various research into the causes of heat resistance of TPC resin-made boots being less than expected, the present inventors have hypothesized that the cause may be due to incompatibility of the grease that is enclosed inside the boot. From this standpoint, various modifications have been made to greases, while repeating heat resistance tests, whereupon knowledge has been gained to the effect that, especially, when a sulfur based extreme-pressure agent made up from a sulfur compound is used as an additive, heat resistance of such TPC-made boots is lowered.

It is conjectured that the reason for such lowering is due to the fact that, when a sulfur based extreme-pressure agent is added and subjected to high temperatures, sulfur radicals are generated as a result of thermal decomposition of the sulfur based extreme-pressure agent, and the sulfur radicals attack the TPC carboxyl bonds (C=O), whereby the TPC ester group becomes severed.

From this standpoint, the present inventors have conducted diligent research directed at preparing greases from components that do not result in generation of radicals that attack TPC, yet which still are capable of ensuring the lubricating properties of the sliding members of a constant velocity universal joint, whereby the present invention is realized.

A principal object of the present invention is to provide a constant velocity universal joint equipped with a resin-made boot formed from TPC, and further which exhibits superior heat resistance.

Another object of the present invention is to provide a constant velocity universal joint capable of ensuring the lubricating properties of sliding members over prolonged periods of time.

In accordance with an embodiment of the present invention, a constant velocity universal joint is provided, comprising an outer member, one end of which is connected to a first transmission shaft and having an opened tubular member at the other end thereof, and further having a plurality of guide grooves separated mutually from each other at predetermined intervals and being disposed on an inner portion of the tubular member, extending from the one end toward the other end, an inner member having at one end thereof sliding contact members held in sliding contact with the guide grooves in the tubular member of the outer member, and wherein the other end thereof is connected to a second transmission shaft, and a boot covering the outer member and the second transmission shaft, with respective ends thereof being fixed to the outer member and to the second transmission shaft, wherein the boot is formed of a polyester-based thermoplastic elastomer, and wherein a grease is enclosed inside the boot comprising a base oil, a thickening agent comprising a diurea-based compound, a molybdenum dialkyldithiocarbamate sulfide represented by the following equation (1), a sulfur-phosphorus based extreme pressure agent made up of a sulfur-phosphorus based compound containing sulfur and phosphorus as constituent elements thereof, and potassium borate hydrate,

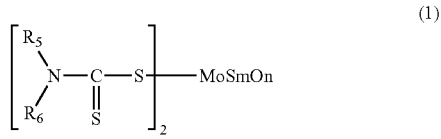

(1)

wherein R5 and R6 represent, respectively and independently, 1-4C alkyl groups, and further, wherein m and n are integers lying in a range of 0 to 4 and satisfying the equation m+n=4.

In the present invention, TPC, which excels in durability, is selected as the material for the boot, and moreover, the aforementioned grease is enclosed inside of the boot. The grease does not contain any sulfur based extreme-pressure agents that could cause deterioration of TPC. Therefore, heat resistance of the boot can be ensured over a long period of time, with the effect that cracking and the like caused by deterioration of the boot due to age-related changes can be suppressed over prolonged periods. Accordingly, leakage of grease from the boot does not occur, and thus, the lubricating capability of the sliding members of the constant velocity universal joint is ensured, and the occurrence of seizure in such sliding parts can be avoided.

Moreover, in the present invention, a grease is used to which there is added a sulfur-phosphorus based extreme-pressure agent, which remarkably improves galling resistance in comparison to other extreme-pressure agents. Owing thereto, the lubrication properties of the sliding members are made extremely favorable.

The sulfur-phosphorus based extreme-pressure agent used in the present invention is a sulfur-phosphorus compound in which sulfur and phosphorus are simultaneously taken as main constituent elements, which does not include a mixture of a sulfur based extreme-pressure agent and a phosphorus based extreme-pressure agent. More specifically, for example, a mixture in which a sulfided fat or oil or a polysulfide containing only a sulfur compound is mixed with a phosphate or phosphate containing only a phosphorus compound would not satisfy the requirements for the sulfur-phosphorus based extreme-pressure agent of the present invention.

When the total weight of the grease is 100 wt %, it is preferable for the molybdenum dialkyldithiocarbamate sulfide to be 0.1 to 5 wt %, the sulfur-phosphorus based extreme pressure agent to be 0.1 to 5 wt %, and the potassium borate hydrate to be 0.1 to 3 wt %. When any of these components is below the above ranges, adequacy of wear resistance and galling resistance becomes difficult to achieve. Further, even if the components are added in excess of the above ranges, wear resistance and galling resistance are not noticeably improved, and thus adding them in excess of the above ranges is uneconomical.

The constant velocity universal joint constructed as described above generally makes up a sliding constant velocity universal joint, which is arranged on the side of a differential gear of an automobile body. Stated otherwise, the constant velocity universal joint is preferably used as an inboard side constant velocity universal joint.

BRIEF DESCRIPTION OF THE DRAWINGS

FIG. 6 is a chart illustrating frictional coefficients and boot durabilities for different greases, having different component ratios.

BEST MODE FOR CARRYING OUT THE INVENTION

A preferred embodiment of a constant velocity universal joint according to the present invention shall be given below and explained in detail with reference to the attached drawings.

Figure 1:
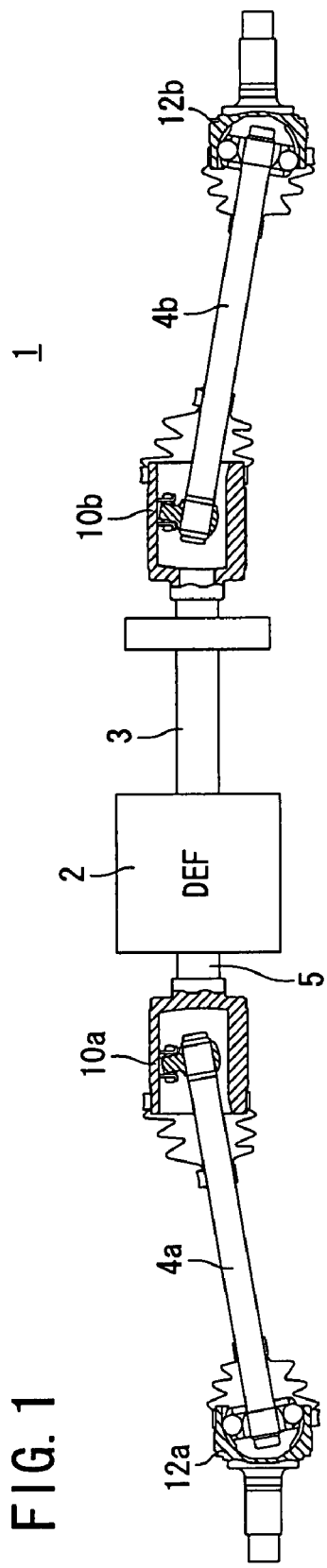
FIG. 1 is a schematic structural view of a motive force transmission mechanism, constructed with a constant velocity universal joint installed therein, according to an embodiment of the present invention.

First, a motive force transmission mechanism, for transmitting motive force from the engine to the tires, and which has a tripod type constant velocity universal joint (sliding type constant velocity universal joint) as the constant velocity universal joint according to the present invention integrated therein, is shown in FIG. 1. In the motive force transmission mechanism 1, a half shaft 3 making up a transmission shaft and spline shafts 4a, 4b are connected in series from a differential gear 2, wherein the spline shafts 4a, 4b are connected respectively to hubs (not shown) over which wheels are fitted externally.

The half shaft 3 and the rotational axis 5 of the differential gear 2 are connected respectively with the spline shafts 4a, 4b via tripod type constant velocity universal joints 10a, 10b, whereas the spline shafts 4a, 4b and the hubs are connected with each other via Birfield type constant velocity universal joints 12a, 12b. Accordingly, the rotational drive force from the engine is transmitted to the tires (not shown) via the differential gear 2, the tripod type constant velocity universal joints 10a, 10b, the half shaft 3 or the rotational axis 5, the spline shafts 4a, 4b, the Birfield type constant velocity universal joints 12a, 12b and the hubs.

Figure 2:
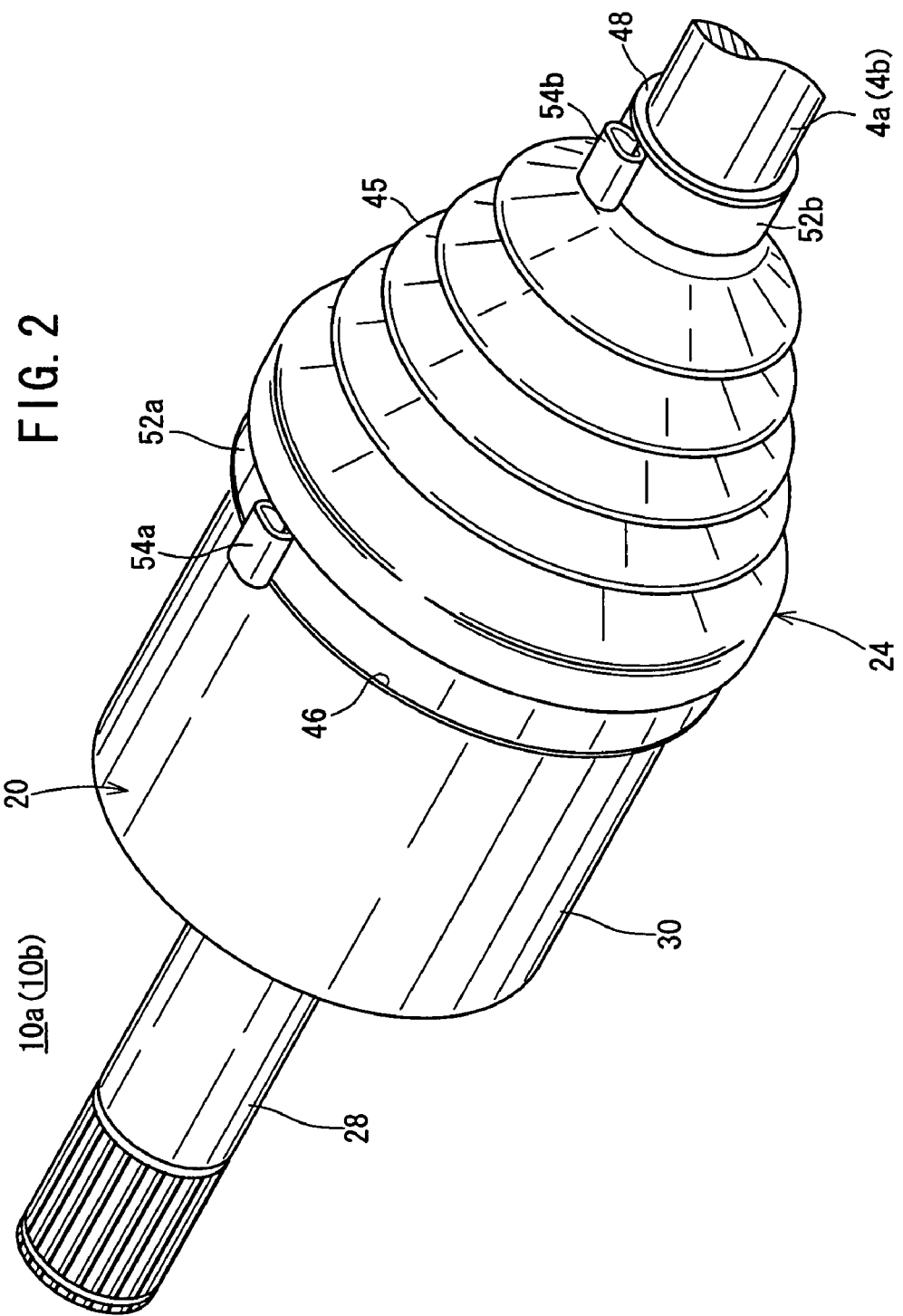
FIG. 2 is a schematic perspective view illustrating principal features of a constant velocity universal joint according to an embodiment of the present invention.
Figure 3:
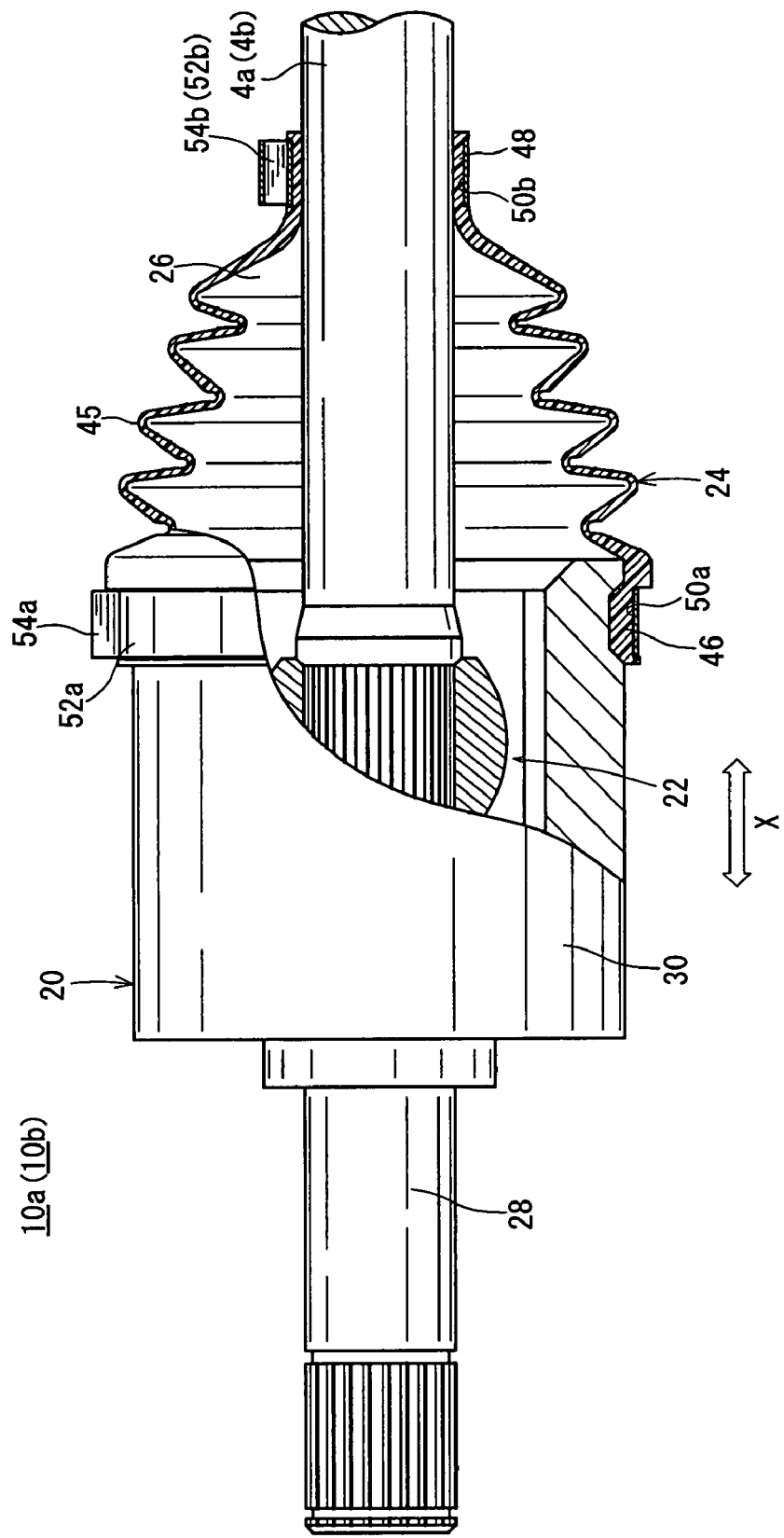
FIG. 3 is a side view, with partial cutaway, of the constant velocity universal joint shown in FIG. 2.

A schematic perspective view illustrating principal features of the tripod type constant velocity universal joint 11a is shown in FIG. 2, while in addition, a side view thereof, with partial cutaway, is shown in FIG. 3. The tripod type constant velocity universal joint 10a includes an outer member 20, an inner member 22 (see FIG. 3) which is inserted into an interior part of the outer member 20, and a boot 24 in the form of a bellows, wherein grease 26 (see FIG. 3) is enclosed inside of the boot 24.

Figure 4:
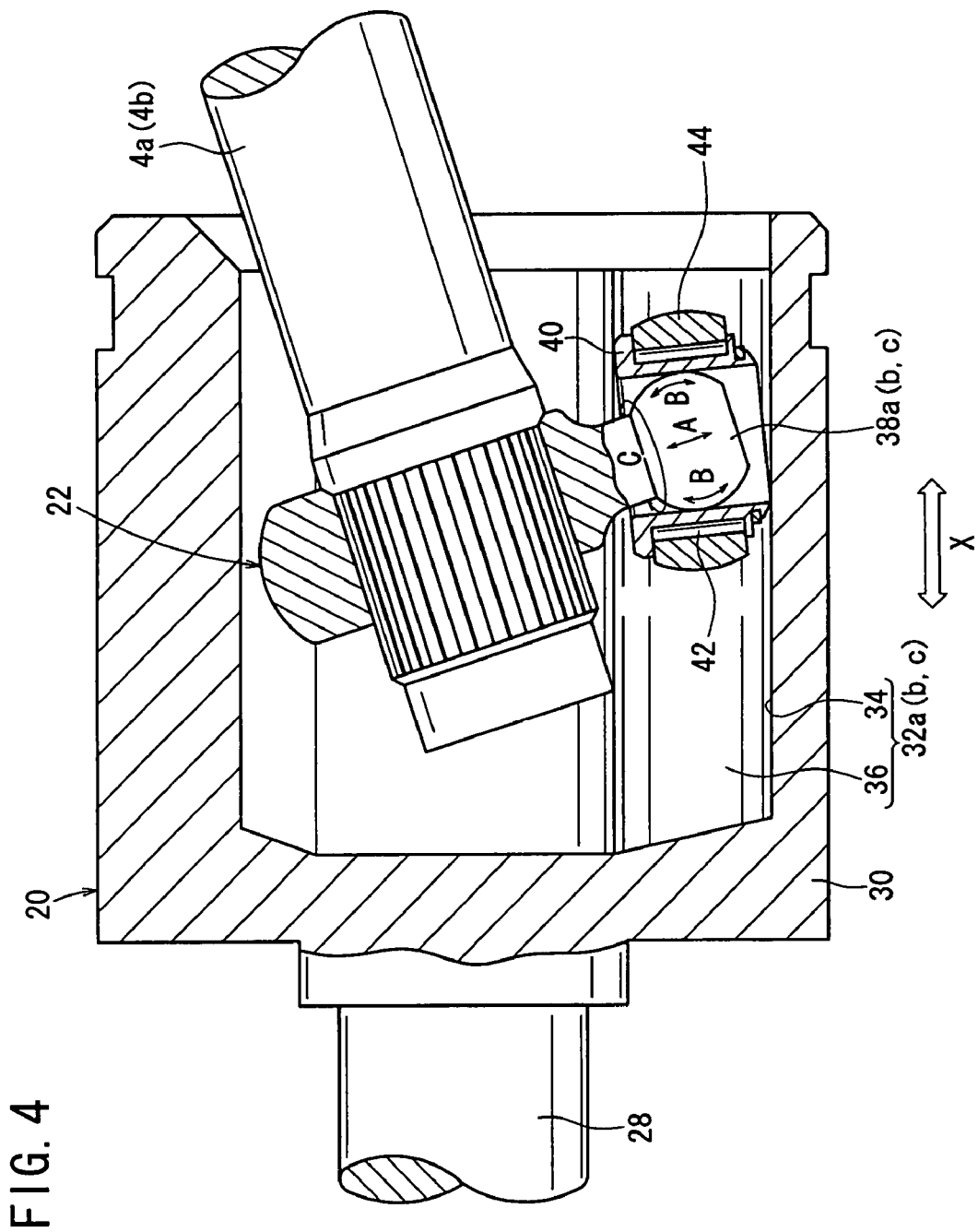
FIG. 4 is a schematic cross-sectional view illustrating principal features of the constant velocity joint shown in FIG. 2, in which the boot have been removed therefrom.
Figure 5:
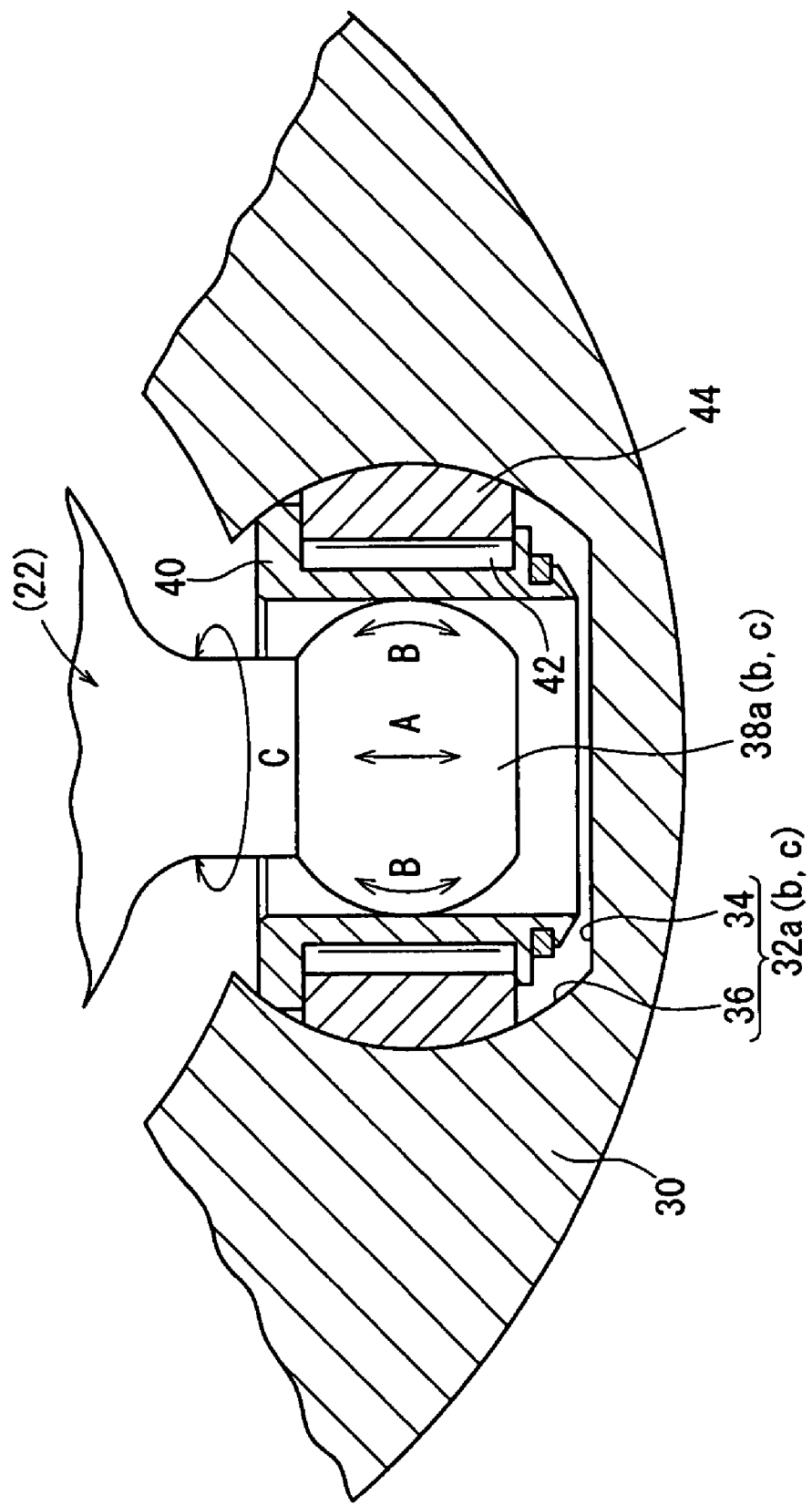
FIG. 5 is an enlarged frontal end view of principal features of the constant velocity joint of FIG. 2.

The outer member 20 includes an elongate shaft 28, and a tubular member 30, which is disposed on one end of the shaft 28. Further, as shown in FIGS. 4 and 5, three guide grooves 32a to 32c are formed, which are separated mutually from each other at angles of 120°, and which extend in the axial direction of the outer member 20 along an inner wall surface of the tubular member 30. The guide grooves 32a to 32c are each constructed of a ceiling portion 34, disposed in a direction extending along an outer peripheral surface of the tubular member 30, and rolling surfaces 36 serving as sliding portions disposed in facing relation to each other along a direction substantially perpendicular to the aforementioned ceiling portion 34.

On the other hand, the inner member 22, which is connected to the end of the spline shaft 4a that makes up the second shaft, is inserted into a hollow internal portion of the tubular member 30 (see FIGS. 3 and 4). As shown in FIG. 5, three trunnions 38a to 38c, which point toward the guide grooves 32a to 32c and expand outwardly, are formed integrally on the inner member 22, wherein the trunnions 38a to 38c are mutually separated from each other at 120° angular intervals.

Cylindrical holders 40 are fitted externally respectively over each of the outer wall portions of the trunnions 38a to 38c. The inner wall surfaces of the holders 40 are formed along a straight line, whereas the outer wall portions of the trunnions 38a to 38c are curved (see FIG. 5). As a result thereof, each of the trunnions 38a to 38c is slidable in the direction of the arrow A in FIG. 5, and more specifically, is slidable along an axial direction of the holder 40, and further, is tiltable through a predetermined angle in the direction of the arrows B with respect to the holder 40. Further, each of the trunnions 38a to 38c is also rotatable in the direction of the arrow C.

An upper end part of the holder 40 projects toward the ceiling portion 34 further than a flat and smooth end surface of each of the trunnions 38a to 38c, the holder 40 being positioned so as to form a slight clearance between itself and the ceiling portion 34.

A roller 44 is fitted over an outer circumference of the holder 40 via a plurality of needle bearings 42. A curved side wall portion of the roller 44 is in slidable contact with respect to the rolling surfaces 36 of each of the guide grooves 32a to 32c, and therefore, each of the rollers 44 is slidable along the rolling surface 36 inside of the tubular member 30 in the direction of the arrow X shown in FIG. 4. As a result, the inner member 22 is displaceable relative to the tubular member 30.

As shown in FIGS. 2 and 3, the outer member 20 and the inner member 22, constructed as described above, are covered by the boot 24. The boot 24, which is made of TPC, includes a bellows member 45 that extends in the longitudinal direction indicated above and has mutually interconnected concave and convex portions. The opening diameter of one end (hereinafter referred to as a large diameter side end 46) of the bellows member 45 corresponds to the diameter of the outer member 20, and the opening diameter of the other end (hereinafter referred to as a small diameter side end 48) corresponds to the diameter of the spline shaft 4a.

An annular band installation groove 50a (see FIG. 3) recessed at a given length is formed on an outer periphery of the large diameter side end 46, wherein a fastening band 52a, which is installed in the band installation groove 50a, is crimped (caulked) at a portion on the outer peripheral surface thereof by an unillustrated caulking jig. As a result, the fastening band 52a is installed so as to encircle and surround the outer peripheral surface of the outer member 20. That is, the large diameter side end 46 is fixed in position onto the outer member 20 by the fastening band 52a.

Furthermore, in the same manner as the band installation groove 50a, an annular band installation groove 50b recessed at a given length is formed on an outer periphery of the small diameter side end 48. A fastening band 52b is installed as well in the band installation groove 50b, wherein the fastening band 52b is crimped (caulked) so that a portion on the outer peripheral surface thereof is pinched from both directions by an unillustrated caulking jig. As a result, the fastening band 52b is installed in the band installation groove 50b so as to encircle and surround the small diameter side end 48, whereby the small diameter side end 48 is fixed in position. In FIGS. 2 and 3, reference numerals 54a, 54b indicate crimped portions, projecting in a radial outward direction for a given length, which are formed when the outer peripheral surfaces of the aforementioned fastening bands 52a, 52b are subjected to caulking.

Prior to caulking both of the fastening bands 52a, 52b by the caulking process described above, a grease 26, which has been filled beforehand, is enclosed inside the boot 24.

As the grease 26, a grease is used containing a base oil, a diurea-based compound (thickening agent), a molybdenum dialkyldithiocarbamate sulfide, a sulfur-phosphorus based extreme pressure agent, and potassium borate hydrate.

As the base oil, any of various conventionally available lubricating oils, including mineral oils, synthetic oils and the like, may be selected. As representative of such synthetic oils, examples include ester based synthetic oils including polyesters and polyol esters, synthetic hydrocarbon oils including poly-α-olefins, polybutene, etc., ether based synthetic oils including alkyldiphenyl ethers, polyprene glycol, etc., silicone oils, and fluorinated oils, or any of various combined oils made up of two or more from among these oils. The viscosity range of the base oil is not particularly limited, but preferably lies in a range of from 2 to 40 cSt at 100° C.

Among the various base oils, mineral oils have viscosities falling within the above-noted range, and further are comparatively inexpensive and hence are advantageous in terms of cost. Moreover, mineral oils are particularly suitable since the compatibility of such oils with other components, such as the thickening agent and the like, is favorable.

As examples of suitable diurea-based compounds that function as thickening agents, reaction products of diisocyanates and monoamines may be given. More specifically, for example, it is acceptable to use as the thickening agent a diurea-based compound that is produced by reacting diisocyanates including phenylene diisocyanate, diphenyl diisocyanate, phenyl diisocyanate, diphenylmethane diisocyanate, octadecane diisocyanate, decane diisocyanate, hexane diisocyanate, etc., with monoamines such as octylamine, dodecylamine, hexadecylamine, octadecylamine, oleylamine, aniline, p-toluidine, and cyclohexylamine, etc. Among these, a reaction product produced by reacting octylamine, dodecylamine, hexadecylamine, octadecylamine, or oleylamine, or a mixture made up of two or more from among such materials, together with the above-mentioned diisocyanates, is particularly suitable.

The molybdenum dialkyldithiocarbamate sulfide is a component for imparting lubricating properties to the grease 26, the general formula for which, as mentioned above, is given by equation 1.

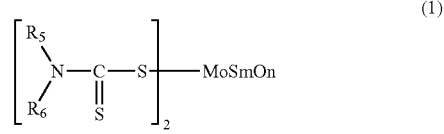

(1)

wherein R5 and R6 represent, respectively and independently, 1-4C alkyl groups, and further, wherein m and n are integers lying in a range of 0 to 4 and satisfying the equation m+n=4.

As suitable examples for such a molybdenum dialkyldithiocarbamate sulfide, molybdenum dimethyldithiocarbamate sulfide, molybdenum diethyldithiocarbamate sulfide, molybdenum dipropyldithiocarbamate sulfide, molybdenum dibutyldithiocarbamate sulfide, molybdenum methylethyldithiocarbamate sulfide, and molybdenum ethylbutyldithiocarbamate sulfide may be given. Of course, mixtures of such materials may also be used.

As suitable examples for the sulfur-phosphorus based extreme pressure agent, thiophosphate or zinc dithiophosphate, which are sulfur-phosphorus compounds including sulfur and phosphorus simultaneously therein as constituent elements, may be given. A general equation for the thiophosphate appears below as equation (2), and a general equation for zinc dithiophosphate appears below as equation (3).

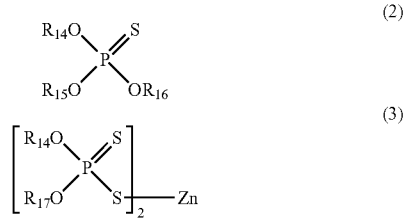

In equations (2) and (3), R14 to R17 represent, respectively and independently, 1-24C alkyl groups, cycloalkyl groups, alkylcycloalkyl groups, aryl groups, alkylaryl groups, or arylalkyl groups. Moreover, R15 and R16 may also be hydrogen.

As specific examples for R14 to R17, the following groups may be included: a methyl group, an ethyl group, a propyl group, a buytl group, a pentyl group, a hexyl group, a heptyl group, an octyl group, a nonyl group, a decyl group, a dodecyl group, a tetradecyl group, a hexadecyl group, an octadecyl group, an eicosyl group, a docosyl group, a tetracosyl group, a cyclopentyl group, a cyclohexyl group, a methylcyclohexyl group, an ethylcyclohexyl group, a dimethylcyclohexyl group, a cycloheptyl group, a phenyl group, a toryl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a dodecylphenyl group, a tetradecylphenyl group, a hexadecylphenyl group, an octadecylphenyl group, a benzyl group, or a phenethyl group or the like.

Concerning the sulfur-phosphorus based extreme pressure agent, it is particularly suitable when R14, R15 and R16 are trialkylthiophosphate or tri(alkylphenyl)thiophosphate which belongs to 12C or 13C alkyl groups.

The potassium borate hydrate is a hydrous compound oxide of potassium and boron, the general equation for which is represented by $K_2O \cdot xB_2O_3 \cdot yH_2O$ (where x=0.5 to 5.0 and y=1.0 to 5.0). It is preferable for the average particle size of the potassium borate hydrate to be 1 μm or less, and more preferably, to be 0.5 μm or less.

When the total weight of the grease 26 containing the aforementioned substances is taken to be 100 wt. %, it is preferable for the proportions of the molybdenum dialkyldithiocarbamate sulfide, the sulfur-phosphorus based extreme pressure agent, and the potassium borate hydrate to be, respectively, 0.1 to 5 wt %, 0.1 to 5 wt %, and 0.1 to 3 wt %. In cases where the contained weight of any of these components does not attain the above ranges, adequacy of wear resistance and galling resistance becomes difficult to achieve. Further, if the components are added in excess of the above ranges, wear resistance and galling resistance are not noticeably improved, and thus doing so is uneconomical.

Moreover, it is acceptable to further add an anti-oxidizing agent, an oiliness agent, a rust preventative agent, and/or a viscosity index-improving agent to the grease 26.

The structure of the remaining tripod type constant velocity universal joint 10b is the same as that of the constant velocity universal joint 10a, and thus detailed explanation thereof is omitted.

The tripod type constant velocity universal joints 10a, 10b are constructed basically as described above. Next, operations and effects thereof shall be explained.

Accompanying driving of the automotive engine, rotational force is transmitted from the differential gear 2, and via the half shaft 3 or the rotational axis 5 and the outer members 20, 20 of each of the tripod-type constant velocity universal joints 10a, 10b to the inner members 22, whereby the spline shafts 4a, 4b undergo rotary motion in a given direction.

Specifically, the rotational force of the outer member 20 is transmitted via the needle bearings 42 and rollers 44, which are in contact with the guide grooves 32a to 32c, and further, is transmitted to the trunnions 38a to 38c via the curved side wall surfaces thereof that are in contact with the inner circumferential surfaces of the holders 40, and as a result, the spline shafts 4a, 4b, which are engaged with the trunnions 38a to 38c, are caused to rotate. The rotational force further is transmitted to the hubs via the Birfield type constant velocity universal joints 12a, 12b, so that ultimately, the tires are rotated, culminating in running of the automobile.

When the spline shafts 4a, 4b are inclined at a predetermined angle with respect to each of the outer members 20, 20 of the tripod type constant velocity universal joints 10a, 10b, and while side wall surfaces of the trunnions 38a to 38c are maintained in contact with the inner circumferential surfaces of the holders 40, the trunnions 38a to 38c are slidably displaced in the direction of the arrow C.

Further, the trunnions 38a to 38c, via the rollers 44 that slide along the guide grooves 32a to 32c, are displaced in the longitudinal direction (arrow X shown in FIGS. 3 and 4) of the guide grooves 32a to 32c.

As understood from the above, in the present embodiment, the tripod type constant velocity universal joints 10a, 10b, which are formed as sliding type constant velocity universal joints, are employed on sides proximate to the differential gear 2, that is, as constant velocity universal joints that are arranged on the inboard side (see FIG. 1).

The boots 24 of the tripod type constant velocity universal joints 10a, 10b actuated as described above easily receive frictional heat that is generated in the tripod type constant velocity universal joints 10a, 10b during sliding movement thereof, and since they are in close proximity to the differential gear 2, they also easily receive radiant heat from the differential gear 2, and thus the boots 24 are exposed to high temperatures.

However, in this case, the boots 24 are constructed from TPC, which is excellent in terms of heat resistance. Moreover, the extreme pressure agent in the grease 26 is a sulfur-phosphorus compound, and does not contain any sulfur-based extreme pressure agent formed of a sulfur compound not including phosphorus therein as a constituent element, and thus, sulfur radicals are not generated within the grease 26. Accordingly, sulfur radicals do not attack TPC, and owing thereto, deterioration of TPC is suppressed remarkably.

Specifically, according to the present embodiment, by enclosing the sulfur-phosphorus based extreme pressure agent inside the boot 24, the heat resistance of the boot 24 can be maintained over a prolonged period of time.

Further, since deterioration of the boot 24 can be avoided over a long time period, the effective lifespan of the boot 24 is made notably longer. Stated otherwise, there is almost no generation of cracks or the like caused by age-related changes in the boot 24. Owing thereto, leakage of grease 26 that is enclosed inside the boot 24 can be avoided, so that ultimately, the lubricative properties of the trunnions 38a to 38c, the rollers 44 and the rolling surfaces 36, which make up sliding parts of the tripod type constant velocity universal joints 10a, 10b, can be secured easily over a long period of time. Accordingly, occurrence of seizure of the trunnions 38a to 38c, the rollers 44 and the rolling surfaces 36 can be avoided.

Concerning the constant velocity universal joints 10a, 10b according to the present embodiment, FIG. 6 shows evaluation results of durability of boots 24 and frictional coefficients of greases according to first through third embodiments, in which each of the respective components of the greases have been changed in the proportions shown in FIG. 6, together with constant velocity universal joints (Comparative Examples 1 to 4) with boots that have enclosed therein greases to which one type from among molybdenum dialkyldithiocarbamate sulfide, a sulfur-phosphorus based extreme pressure agent, and potassium borate hydrate has not been added, or greases to which a sulfur based extreme-pressure agent has been added in addition to molybdenum dialkyldithiocarbamate sulfide, the sulfur-phosphorus based extreme pressure agent, and potassium borate hydrate.

For the frictional coefficient, measurements were taken using an SRV friction abrasion testing machine under measurement conditions for 10 minutes at a load of 100 N, an amplitude of vibration of 2 mm, a frequency of 30 Hz, and at a temperature of 100° C. In FIG. 6, "circle" represents "within 0.08", "triangle" represents "in excess of 0.08 and below 0.12", and "X" represents "0.12 or above".

Further, for the high temperature resistance test, tripod type constant velocity universal joints 10a having grease compositions enclosed therein were rotated for 500 hours at a rotational rate of 600 rpm and at a temperature of 130° C. Cases wherein deterioration of the physical properties of the boot 24 was within 20% are indicated by "circle", whereas those in excess of 50% are indicated by "X".

From FIG. 6, it is clearly seen that by adding all of molybdenum dialkyldithiocarbamate sulfide, the sulfur-phosphorus based extreme pressure agent, and potassium borate hydrate, along with not adding any sulfur based extreme-pressure agents, the durability of the boot 24 can be improved, and further, a grease having an appropriate frictional coefficient is enabled.

In the above embodiment, an example has been given and described in which the tripod type constant velocity universal joints 10a, 10b are employed as inboard side constant velocity universal joints. However, it is also acceptable to employ the constant velocity universal joints, having TPC-fabricated boots 24 installed thereon and wherein the boots 24 enclose therein a grease 26 containing the aforementioned components, as outboard side constant velocity universal joints. In this case, the hubs serve as first transmission shafts, and the spline shafts 4a, 4b make up second transmission shafts.

The invention claimed is:

1. A constant velocity universal joint, comprising:
an outer member, one end of which is connected to a first transmission shaft and having an opened tubular member at the other end thereof, and further having a plurality of guide grooves separated mutually from each other at predetermined intervals and being disposed on an inner portion of said tubular member, extending from said one end toward said other end;
an inner member having at one end thereof sliding contact members held in sliding contact with said guide grooves in said tubular member of said outer member, and wherein said other end thereof is connected to a second transmission shaft; and
a boot covering said outer member and said second transmission shaft, with respective ends thereof being fixed to said outer member and to said second transmission shaft, wherein said boot is formed of a polyester-based thermoplastic elastomer, and
wherein a grease is enclosed inside said boot containing a base oil, a thickening agent comprising a diurea-based compound, a molybdenum dialkyldithiocarbamate sulfide represented by the following equation, a sulfur-phosphorus based extreme pressure agent made up of a sulfur-phosphorus based compound containing sulfur and phosphorus as constituent elements thereof, and potassium borate hydrate,

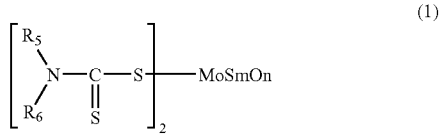

(1)

wherein R5 and R6 represent, respectively and independently, 1-4C alkyl groups, and further, wherein m and n are integers lying in a range of 0 to 4 and satisfying the equation m+n=4.

2. The constant velocity universal joint according to claim 1, wherein, when the total weight of said grease is 100 wt %, said molybdenum dialkyldithiocarbamate sulfide is 0.1 to 5 wt %, said sulfur-phosphorus based extreme pressure agent is 0.1 to 5 wt %, and said potassium borate hydrate is 0.1 to 3 wt %.

3. The constant velocity universal joint according to claim 1, wherein the constant velocity universal joint comprises a sliding type constant velocity universal joint installed on a side of a differential gear of an automobile body.

4. The constant velocity universal joint according to claim 1, wherein said sulfur-phosphorus based extreme pressure agent is a thiophosphate.

5. The constant velocity universal joint according to claim 4, wherein thiophosphate comprises one of a trialkylthiophosphate and a tri(alkylphenyl)thiophosphate.

6. The constant velocity universal joint according to claim 1, wherein said sulfur-phosphorus based extreme pressure agent comprises a zinc dithiophosphate.

7. The constant velocity universal joint according to claim 1, wherein said thickening agent comprises a diurea-based compound produced by reacting at least one from among phenylene diisocyanate, diphenyl diisocyanate, phenyl diisocyanate, diphenylmethane diisocyanate, octadecane diisocyanate, decane diisocyanate, and hexane diisocyanate, with at least one from among octylamine, dodecylamine, hexadecylamine, octadecylamine, oleylamine, aniline, p-toluidine, and cyclohexylamine.

8. The constant velocity universal joint (40a) according to claim 1, wherein said molybdenum dialkyldithiocarbamate sulfide comprises at least one selected from among molybdenum dimethyldithiocarbamate sulfide, molybdenum diethyldithiocarbamate sulfide, molybdenum dipropyldithiocarbamate sulfide, molybdenum dibutyldithiocarbamate sulfide, molybdenum methylethyldithiocarbamate sulfide, and molybdenum ethylbutyldithiocarbamate sulfide.

9. The constant velocity universal joint WO according to claim 1, wherein an average particle size of said potassium borate hydrate is 1 μm or less.

10. The constant velocity universal joint according to claim 9, wherein the average particle size of said potassium borate hydrate is 0.5 μm or less.

* * * * *